Jan. 4, 1966   G. CARNELLI   3,226,988
CRANK SHAFTS
Filed Aug. 5, 1963   2 Sheets-Sheet 1
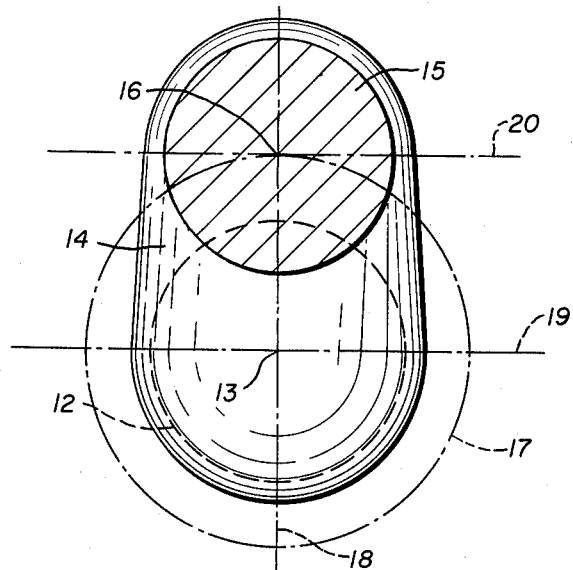
Fig-1
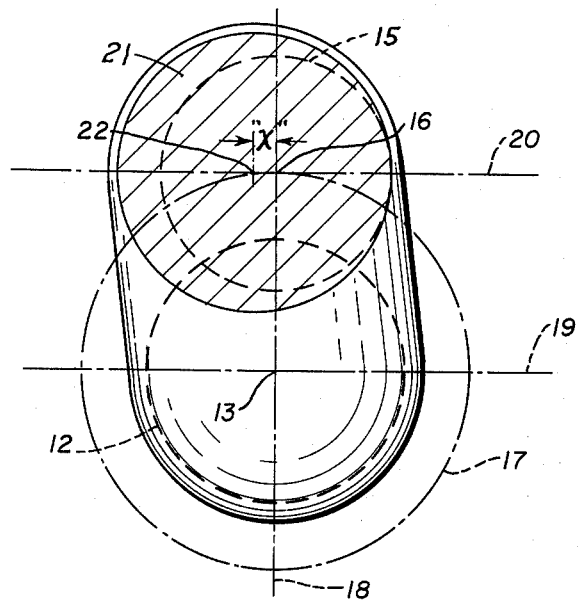
Fig-2
INVENTOR.
GRISPINO CARNELLI
BY
ATTORNEY

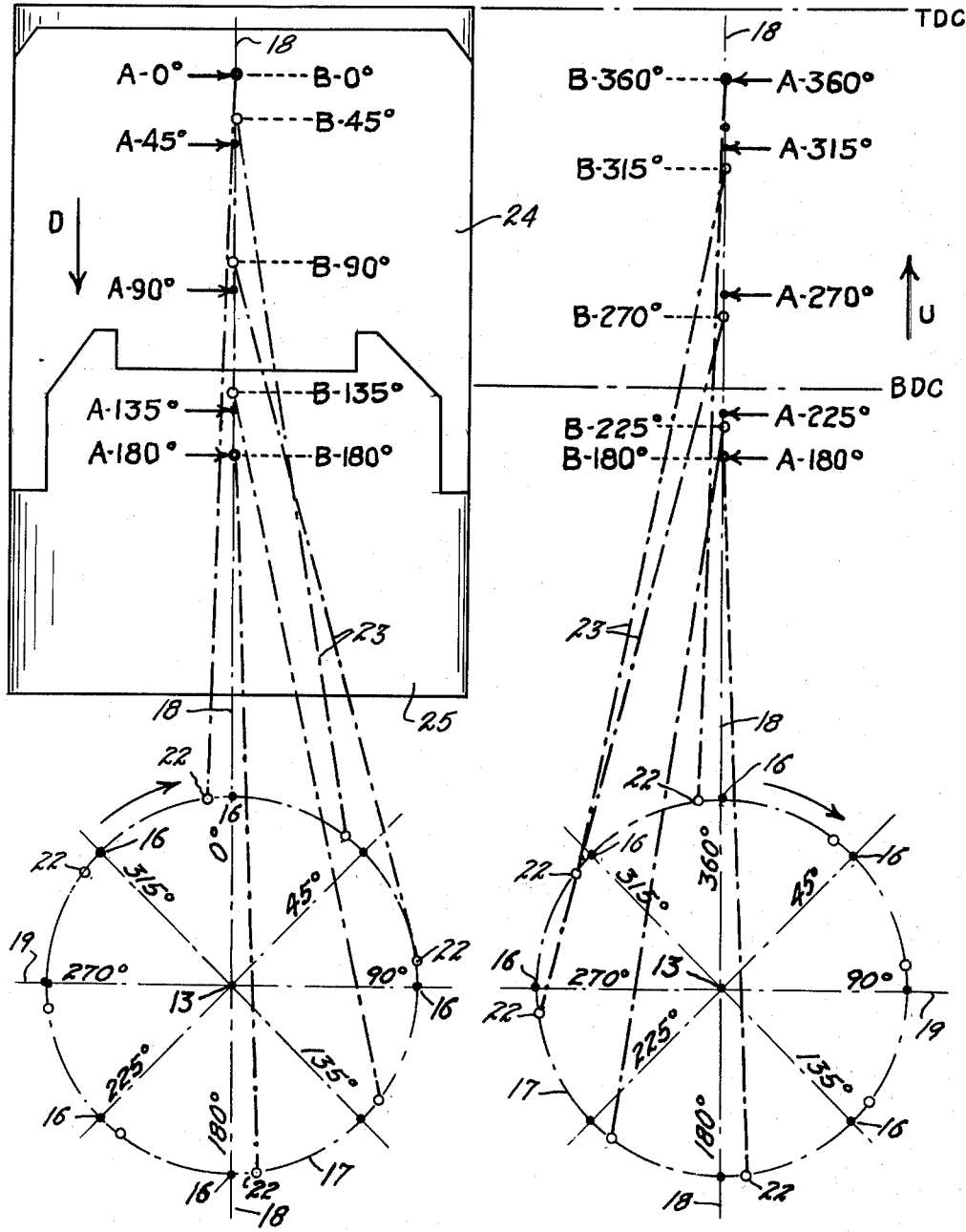

United States Patent Office 3,226,988
Patented Jan. 4, 1966

3,226,988
CRANK SHAFTS
Grispino Carnelli, 1234 Pine St., Pueblo, Colo.
Filed Aug. 5, 1963, Ser. No. 299,992
1 Claim. (Cl. 74—44)

This invention relates to crank shafts of the type designed to actuate or be actuated by pistons connected to the crank pins of the crank shaft through the medium of connecting rods such as used in external and internal combustion engines, compressors, pumps and the like.

The principal object of the invention is to provide a crank shaft which will move a piston at a greater speed during a portion of its stroke than the conventional crank without change in the length of stroke or the speed of rotation of the shaft.

Another object of the invention is to provide a crank shaft for an internal combustion engine with the axes of the crank pins positioned eccentrically of the normal crank pin axes so that the pistons will travel more rapidly on the exhaust strokes than on the intake strokes, thus resulting in a more complete scavenging of the cylinders, a more turbulent and intimate gas mixture, a more complete intake of gases and a more complete absorption of power, thus resulting in greater power for any given piston displacement.

A further object is to apply the same invention to piston-type compressors or pumps to provide a relatively rapid piston travel on the intake stroke and a relatively slow and more powerful piston travel on the compression stroke at uniform crank shaft speed.

Other objects and advantages reside in the detail construction of the invention, which is designed for simplicity, economy, and efficiency. These will become more apparent from the following description.

The invention applies to the individual cranks along a crank shaft, therefore, only a single crank will be discussed herein, it being understood that the discussed crank may be repeated along the crank shaft to provide the cranks for any desired number of cylinders.

In the following detailed description of the invention, reference is had to the accompanying drawing which forms a part hereof. Like numerals refer to like parts in all views of the drawing and throughout the description.

It has been found that the new cranks of this invention can be best described by comparison with the well known cranks of conventional crank shafts and such a comparison is used in the following description and the accompanying drawings:

In the drawings:

FIG. 1 is a cross section through a crank pin of a crank shaft of the conventional variety with the crank pin and crank shaft in a position corresponding to the top dead center position of the piston;

FIG. 2 is a similar cross section through a crank pin of this invention showing its relation to the conventional crank of FIG. 1 also in the top dead center position of the piston;

FIG. 3 is a diagram comparing the travel of a piston influenced by this invention with the travel of a piston actuated by a conventional crank shaft during the first 180° of rotation; and FIG. 4 is a similar diagram showing the relative positions of the pistons during the second 180° of a complete rotation.

In FIG. 1 the circumference of a crank shaft is indicated by the broken line circle 12 with its axis at 13. The crank is shown at 14 with its crank pin in cross-section at 15 and the axis of the crank pin at 16. The circle of rotation of the crank pin axis is indicated by the dot-dash circle 17, the center line of a cylinder in which a piston would be reciprocated in consequence of the rotation of the crank pin 15 in its circle of rotation 17 is indicated at 18, the axis plane of the shaft 12 is indicated at 19 at 90° to the center line 18, and the parallel axis plane of the crank pin 15 is indicated at 20 parallel to the axis plane 19 of the shaft 12. It will be noted that with the conventional crank structure as shown in FIG. 1, when the piston is either at its top dead center position or its bottom dead center position, the crank pin axis 16 will fall on the cylinder center line 18.

The above-described structure is conventional and is shown and described herein for the purpose of comparison with the new crank shaft arrangement.

The new structure is shown in FIG. 2 with the elements 12, 13, 14, 17, 18, 19 and 20 still in place but with a new enlarged crank pin 21 replacing the former crank pin 15 and with the axis of the new crank pin, indicated at 22, eccentrically displaced along the axis plane 20 a predetermined distance "X." The new axis 22 still travels concentrically around the circle 17 similarly to the former axis 16 of the original crank pin 15. In this case, when the piston is at top dead center or bottom dead center, the crank pin axis 22 will not fall on the cylinder center line 18, but will be offset along plane 20, a distance "X." The difference in results, however, is diagrammatically shown in FIGS. 3 and 4.

In FIGS. 3 and 4 various 45° positions of the conventional crank pin axis 16 are indicated by black dots and the relative positions of the new eccentric axis 22 are indicated by the small open circles on the travel circle 17. Each position of the eccentric crank pin axis 22 is diagrammatically connected in both figures by means of a connecting rod, represented by the dot-dash line 23, with the axis of the wrist pin of a conventional piston 24 reciprocable in a cylinder 25, as represented by the open circles along the center line 18 and designated by the letter "B." The corresponding positions of the axis of the wrist pin along the center line 18 when using the conventional crank pin of FIG. 1 are indicated by the arrows "A."

In FIG. 3 the piston is diagrammed as traveling downwardly as indicated by the arrow "D" and, in FIG. 4 the piston is similarly diagrammed as traveling upwardly as indicated by the arrow "U."

It will be noted, by study of FIG. 3, that when the crank shaft has rotated forwardly 45° the wrist pin will have traveled a less distance downwardly, see B–45°, than the normal position, see A–45°, and at 90° the difference in travel is still greater, B–90° compared to A–90°. Thus, it can be seen that the piston has moved slower than the normal piston movement at the same crank shaft speed. After 90° the new position begins to overtake the old position, compare B–135° with A–135°, and at 180° the two piston positions correspond, see A–180° and B–180°. Thus, due to the slower piston travel during the first 180° of travel a greater advantage is obtained from the power stroke of an engine.

In FIG. 4 the final 180° of rotation is diagrammed. The conventional piston and the new piston positions correspond at the 180° or lower dead center point yet begin to separate as the piston starts upwardly, compare B–225° with A–225°, until the 270° point is reached at which time the conventional piston position, indicated at A–270°, will be spaced ahead of the new eccentric position, indicated at B–270°, a distance equal to the selected eccentricity "X." Since the distance from B–270° to the top dead center position, B–360° is greater than the normal conventional crank pin would travel, A–270° to A–360°, the piston must move at a much higher speed than normal through the 90° of rotation. The slow initial movement and rapid finishing movement intakes a greater volume of air and gases and creates a greater turbulence and intermixing action at the intake of an internal combustion engine greatly increasing the engine efficiency.

As described, the eccentricity "X" has been set rearwardly, referring to the direction of rotation, from the normal axis 16. It could, if advisable in certain designs, be set forwardly thereof. Such a setting would increase the piston speed on the down stroke "D" instead of decreasing it as above described.

While a specific form of the invention has been described and illustrated herein, it is to be understood that the same may be varied within the scope of the appended claim without departing from the spirit of the invention.

Having thus described the invention, what is claimed and desired secured by Letters Patent is:

In combination, a cylinder, a piston reciprocable within said cylinder, a crank shaft, the longitudinal axis of said crank shaft intersecting the axis of said cylinder, a crank extending radially of said crank shaft, a cylindrical crank pin eccentrically and non-rotatably mounted on said crank, the axis of said crank pin being offset from the axis of said cylinder when the piston is in its top dead center position within said cylinder, a connecting rod having a circular lower crank pin engaging end fixed rigidly thereto, said lower end pivotally connected to and directly bearing against said crank pin, and a wrist pin pivotally connecting the other end of said connecting rod to said piston.

References Cited by the Examiner
UNITED STATES PATENTS

| | | | |
|---|---|---|---|
| 1,138,892 | 5/1915 | Roberts | 123—197 |
| 1,141,658 | 6/1915 | Schmied | 74—44 |
| 1,572,918 | 2/1926 | Geddes | 123—197 |
| 1,979,987 | 11/1934 | Mullin | 74—36 |

OTHER REFERENCES

Dykes Automobile & Gasoline Engine Encyclopedia, 22nd Ed., page 61, TL 145, D93, 1950.

BROUGHTON G. DURHAM, *Primary Examiner.*

WESLEY S. RATLIFF, JR., *Assistant Examiner.*